(12) United States Patent
Ozaki et al.

(10) Patent No.: US 7,169,829 B2
(45) Date of Patent: Jan. 30, 2007

(54) MALEIMIDO-BEARING COMPOUNDS RESIN COMPOSITION CONTAINING THE SAME AND CURED ARTICLES THEREOF

(75) Inventors: Toru Ozaki, Washimiya-machi (JP); Hiroo Koyanagi, Tokyo (JP); Minoru Yokoshima, Toride (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 274 days.

(21) Appl. No.: 10/497,437

(22) PCT Filed: Dec. 26, 2002

(86) PCT No.: PCT/JP02/13710

§ 371 (c)(1),
(2), (4) Date: Jun. 2, 2004

(87) PCT Pub. No.: WO03/055924

PCT Pub. Date: Jul. 10, 2003

(65) Prior Publication Data

US 2005/0009947 A1   Jan. 13, 2005

(30) Foreign Application Priority Data

Dec. 27, 2001 (JP) ............................. 2001-396666
Apr. 22, 2002 (JP) ............................. 2002-119068
Apr. 23, 2002 (JP) ............................. 2002-120498

(51) Int. Cl.
*C07D 207/00* (2006.01)
*C07D 209/00* (2006.01)
*C07D 207/02* (2006.01)

(52) U.S. Cl. .......... 522/176; 522/63; 522/168; 522/134; 522/135; 522/143; 522/144; 522/146; 522/147; 522/181; 522/151; 522/166; 522/169; 522/182

(58) Field of Classification Search .......... 522/63, 522/168, 176, 134, 135, 143, 144, 146, 147, 522/181, 151, 166, 169, 173, 182
See application file for complete search history.

(56) References Cited

FOREIGN PATENT DOCUMENTS

| JP | 3-59666 | 3/1991 |
|----|---------|--------|
| JP | 3-64755 | 3/1991 |
| JP | 5-80511 | 4/1993 |
| JP | 6-336474 | 12/1994 |
| JP | 11-212251 | 8/1999 |
| WO | 00/10974 | 3/2000 |

OTHER PUBLICATIONS

International Search Report dated Apr. 1, 2003.

*Primary Examiner*—Sanza L. McClenodon
(74) *Attorney, Agent, or Firm*—Nields & Lemack

(57) ABSTRACT

The present invention provides (meth)acrylate compounds bearing a specific maleimide group and resin compositions containing said compounds that can be cured by irradiation of light in a practical dose even when a photoinitiator is not used or used in a smaller amount than that of the prior art, and cured articles of the resin compositions.

8 Claims, No Drawings

MALEIMIDO-BEARING COMPOUNDS RESIN COMPOSITION CONTAINING THE SAME AND CURED ARTICLES THEREOF

FIELD OF THE INVENTION

The present invention relates to (meth)acrylate compounds bearing a novel maleimide group curable by a ray and resin compositions containing the same that are useful for various kinds of coating materials, surface treatment agents, materials for an optical waveguide circuit, molding materials, laminated plates, adhesives, pressure-sensitive adhesives, printing inks, resist inks, binders or the like. In more detail, the present invention relates to novel resin compositions that can be sufficiently cured by irradiation of ultraviolet light or visible light in a practical dose even when a photoinitiator is not used or used in a smaller amount than that of the prior art, and cured articles of the resin compositions.

PRIOR ART

Resin compositions polymerized by a ray such as ultraviolet light and visible light are prevalently used for paints, printing inks, adhesives, coating materials or the like with an advantage of fast curing. Conventional resin compositions curable by a ray, however, require a photoinitiator to be used because they do not initiate polymerization by themselves. An amount of the photoinitiator to be added tends to be increased for the purpose to improve an efficiency in operation, because the photoinitiator has a nature that an increased addition amount promotes curing more faster.

Further, since an unreacted photoinitiator or decomposition products thereof remain in a cured article obtained from the resin composition curable by a ray containing the photoinitiator, they sometimes cause yellowing of the cured article or an offensive odor when the cured article is exposed to light or heat. In addition, a cured article obtained from the resin composition curable by a ray containing a photoinitiator is not generally suitable for use for food packaging materials because the unreacted photoinitiator or the like sometimes bleeds out when the cured article is left in water or the like.

In order to overcome these disadvantages of the resin composition curable by a ray containing a photoinitiator, JP-A-6-298817 discloses a photopolymerization method to employ a charge transfer complex formed by combining a maleimide compound as an electron acceptor with an electron donor to obtain a resin composition curable by a ray not containing a photoinitiator.

Further, "Polymer Materials Science and Engineering" (vol. 72, p. 470–472 (1995)) and "The 4th Fusion UV Technology Seminar" (p. 43–77(1996)) report a method to employ a maleimide derivative as an electron acceptor and vinyl ether as an electron donor. These literatures describe a photopolymerizable composition comprising a combination of 1,4-bis(vinyloxymethyl)cyclohexane and cyclohexylmaleimide, or a photopolymerizable composition comprising a combination of 4-hydroxybutyl vinyl ether and hydroxyalkylmaleimide as a polymerizable composition in the absence of a photoinitiator. These compositions, however, had a problem of not forming a good cured film even though curing proceeded.

On the other hand, "Polymer Preprints" (vol. 37, No. 2, p. 348–349 (1996)) discloses maleimides such as N,N'-4,9-dioxa-1,12-bismaleimidedecane as a polymerization initiator for 1,6-hexanediol diacrylate or polyethylene glycol #400 diacrylate. These maleimides were often in a solid state and had a problem of poor solubility to acrylates, which were often used together with a photo-curable resin composition.

DISCLOSURES OF THE INVENTION

After an intensive study to solve the above problems, the present inventor has found that (meth)acrylate compounds bearing a maleimide group of a specific structure has a characteristic to be cured by light in the absence of a photoinitiator, and accomplished the present invention.

In other words, the present invention relates to inventions described in (1) to (10) below.

(1) A photo-curable resin composition characterized by containing at least one compound selected from the maleimide compounds described in (A1) to (A4) below:
 (A1) a maleimide compound that is a reaction product of a monocarboxylic acid (a) bearing a maleimide group, (meth)acrylic acid (b) and a polyol compound (c);
 (A2) a maleimide compound that is a reaction product of a compound (d) bearing one (meth)acrylate group and one hydroxyl group in the molecule thereof, and a monocarboxylic acid (e) bearing a maleimide group;
 (A3) a maleimide compound that is a reaction product of a dioxane compound (f) represented by the general formula (1):

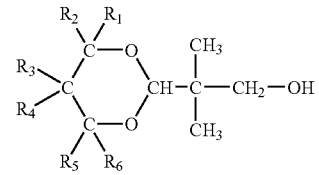

(in the formula (1), $R_1$ to $R_6$ are each a hydrogen atom, —$CH_2$—OH or C1 to C20 alkyl group) and a monocarboxylic acid (g) bearing a maleimide group;
 (A4) a maleimide compound that is a reaction product of a compound (h) bearing one or two hydroxyl groups and a fluorine atom, and a monocarboxylic acid (i) bearing a maleimide group.

(2) A maleimide compound (A1) that is a reaction product of a monocarboxylic acid (a) bearing a maleimide group, (meth)acrylic acid (b) and a polyol compound (c).

(3) A maleimide compound (A2) that is a reaction product of a compound (d) bearing one (meth)acrylate group and one hydroxyl group in the molecule thereof, and a monocarboxylic acid (e) bearing a maleimide group.

(4) A maleimide compound (A3) that is a reaction product of a dioxane compound (f) represented by the general formula (1):

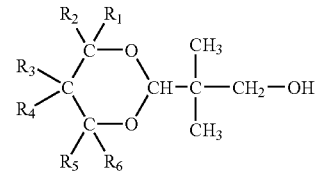

(in the formula (1), $R_1$ to $R_6$ are each a hydrogen atom, —$CH_2$—OH or C1 to C20 alkyl group) and a monocarboxylic acid (g) bearing a maleimide group.

(5) A maleimide compound (A4) that is a reaction product of a compound (h) bearing one or two hydroxyl groups and a fluorine atom, and a monocarboxylic acid (i) bearing a maleimide group.

(6) A resin composition characterized by containing at least one compound selected from the (meth)acrylate compounds (A1) to (A4) bearing a maleimide group described in the invention (1) and a polymerizable compound (B) other than the (meth)acrylate compounds (A1) to (A4).

(7) The resin composition according to the above invention (6), wherein, said polymerizable compound (B) is at least one compound selected from a group consisting of a compound (F-1) bearing a (meth)acryloyl group, a compound (F-2) bearing a vinyl ether group and a compound bearing an N-vinyl group.

(8) The resin composition according to the above invention (7), wherein, said compound (F-1) bearing a (meth) acryloyl group is at least one compound selected from a group consisting of a (poly)ester (meth)acrylate (F-1-1), urethane (meth)acrylate (F-1-2), epoxy (meth)acrylate (F-1-3), (poly)ether (meth)acrylate (F-1-4), alkyl (meth) acrylate or alkylene (meth)acrylate (F-1-5), (meth)acrylate (F-1-6) having an aromatic ring and (meth)acrylate (F-1-7) having an alicyclic structure.

(9) The resin composition according to the above invention (7), wherein, said compound (F-2) bearing a vinyl ether group is at least one compound selected from a group consisting of an alkyl vinyl ether (F-2-1) wherein the other end thereof may be substituted with a halogen atom or a hydroxyl group, a cycloalkyl vinyl ether (F-2-2) wherein the other end thereof may be substituted with a halogen atom or a hydroxyl group, as well as a monovinyl ether, a divinyl ether or a polyvinyl ether (F-2-3) that has such a structure that a vinyl ether group is bonded to an alkylene group and also bonded to at least one group selected from a group consisting of an alkyl group, a cycloalkyl group and an aromatic group that may have a substitute, via at least one linkage group selected from a group consisting of an ether linkage, a urethane linkage and an ester linkage.

(10) A cured article of the resin composition according to any one of the above inventions (6) to (9).

BEST MODE FOR CARRYING OUT THE INVENTION

An aspect of the present invention is a (meth)acrylate compound (A1) bearing a maleimide group, maleimide compounds (A2), (A3) and (A4), as well as a resin composition containing these compounds (A1) to (A4) and a cured article thereof. Further, another aspect of the present invention is a photo-curable resin composition containing the above (meth)acrylate compound (A1) bearing a maleimide group, maleimide compounds (A2), (A3) and (A4), and a polymerizable compound other than these compounds, as well as a cured article thereof.

The present invention will be described in more detail, hereinbelow.

Specific examples of the (meth)acrylate compound (A1) bearing a maleimide group include a compound obtained by a dehydration reaction of a monocarboxylic acid (a) bearing a maleimide group, (meth)acrylic acid (b) and an polyol compound (c), and the like.

Specific examples of the monocarboxylic acid (a) bearing a maleimide group include a compound (a-1) synthesized from maleic anhydride and a primary aminocarboxylic acid as represented by the formula below:

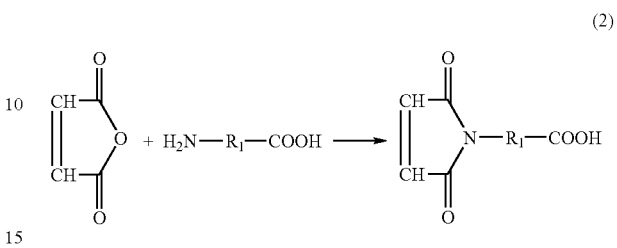

(in the formula (2), $R_1$ is an aliphatic residue or an aromatic residue) using a known technology [for example, D. H. Rich et al., Journal of Medical Chemistry: vol. 18, p1004–1010, (1975)], a half-esterified compound (a-2) of a maleimide compound bearing a hydroxyl group and a compound bearing one acid anhydride group in the molecule thereof and the like.

The maleimide compound bearing a hydroxyl group can be synthesized, for example, from maleimide and formaldehyde as shown by the reaction scheme below:

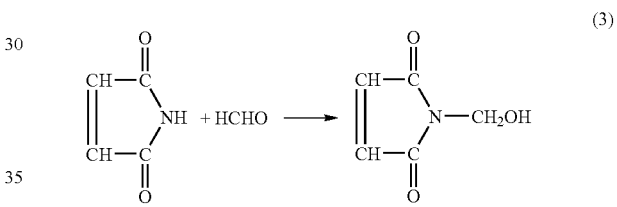

or from maleic anhydride and a primary amino alcohol as represented by the reaction scheme below:

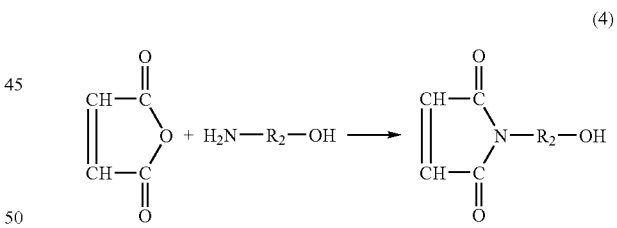

(in the formula (4), $R_2$ is an aliphatic residue or an aromatic residue) using a known technology (for example, U.S. Pat. No. 2,526,517 and JP-A-2-268155).

The primary aminocarboxylic acid to be used in the above reaction includes, but is not limited to, for example, asparagine, alanine, β-alanine, arginine, isoleucine, glycin, glutamine, tryptophan, threonine, valine, phenylalanine, homophenylalanine, α-methyl-phenylalanine, lysine, leucine, cycloleucine, 3-aminopropionic acid, α-aminobutyric acid, 4-aminobutyric acid, aminovalerianic acid, 6-aminocaproic acid, 7-aminoheptanoic acid, 2-aminocaprylic acid, 3-aminocaprylic acid, 6-aminocaprylic acid, 8-aminocaprylic acid, 9-aminononanoic acid, 2-aminocapric acid, 9-aminocapric acid, 15-aminopentadecanoic acid, 2-aminopalmitic acid and 16-aminopalmitic acid.

The primary amino alcohol to be used for the above reaction includes, but is not limited to, for example, 2-aminoethanol, 1-amino-2-propanol, 3-amino-1-propanol, 2-amino-2-methyl-1-propanol, 2-amino-3-phenyl-1-propanol, 4-amino-1-butanol, 2-amino-1-butanol, 2-amino-3-methyl-1-butanol, 2-amino-4-methylthio-1-butanol, 2-amino-1-pentanol (1-aminocyclopentane)methanol, 6-amino-1-hexanol, 7-amino-1-butanol and 2-(2-aminoethoxy)ethanol.

Specific examples of the compound bearing one acid anhydride group in the molecule thereof include a maleic anhydride, succinic anhydride, phthalic anhydride, hexahydrophthalic anhydride, tetrahydrophthalic anhydride, methyl-hexahydrophthalic anhydride, methyltetrahydrophthalic anhydride and the like.

The above half-esterified compound (a-2) can be obtained by reacting 1 chemical equivalent of a hydroxyl group of the above maleimide compound bearing a hydroxyl group and about 1 chemical equivalent of an anhydride group of the above compound bearing one acid anhydride group in the molecule thereof. Reaction temperature is preferably 60 to 100° C., and reaction time is preferably 1 to 10 hours. An organic solvent may be used in the reaction, if necessary. The organic solvent that can be used includes methyl ethyl ketone, methyl butyl ketone, benzene, toluene, n-heptane, n-hexane, cyclohexane and the like.

In the present invention, (meth)acrylic acid (b) means acrylic acid or methacrylic acid, which can be used alone or in combination thereof.

Specific examples of the polyol compound (c) include a diol compound (c-1) such as ethylene glycol, propylene glycol, 1,2-butylene glycol, 1,4-butanediol, 3-methyl-1,5-pentanediol, neopentyl glycol, 1,6-hexanediol, 1,9-nonanediol, 2-butyl-2-ethyl-1,3-propanediol, cyclohexane-1,4-dimethanol, bisphenol A polyethoxydiol, bisphenol F polyethoxydiol and hydrogenated bisphenol A; a triol compound (c-2) such as trimethylolpropane, trimethylolethane and glycerin; a tetraol compound (c-3) such as pentaerythritol, diglycerin and ditrimethylolpropane; a hexaol compound (c-4) such as dipentaerythritol; a polyether polyol compound (c-5), that is, a reaction product of the above diol compound (c-1), triol compound (c-2), tetraol compound (c-3) and hexaol compound (c-4), and an alkylene oxide (for example, ethylene oxide, propylene oxide and butylene oxide); a polycarbonate polyol compound (c-6), that is, a reaction product of the above diol compound (c-1) and a dialkyl carbonate (for example, dimethyl carbonate and diethyl carbonate); a polyester polyol compound (c-7), that is, a reaction product of the above polyol compound such as (c-1), (c-2), (c-3) and (c-4), and a polybasic acid such as maleic acid, fumaric acid, succinic acid, adipic acid, phthalic acid, isophthalic acid, tetrahydrophthalic acid, hexahydrophthalic acid, a dimmer acid, sebacic acid, azelaic acid, 5-sodiumsulfoisophthalic acid, trimellitic acid and pyromellitic acid as well as an anhydride thereof; a lactone-denatured polyester polyol (c-8), that is, a reaction product of the above polyol compound such as (c-1), (c-2), (c-3) and (c-4), and the above polybasic acid as well as an anhydride thereof and lactones (for example, $\epsilon$-caprolactone and $\delta$-valerolactone); a lactone-denatured polyol (c-9), that is, a reaction product of the above polyol compound such as (c-1), (c-2), (c-3) and (c-4) and lactones (for example, $\epsilon$-caprolactone); the other polyol (c-10) such as a polyol containing a fluorine atom, a silicon-denatured polyol, a polybutadiene polyol, a polymer polyol (for example, a copolymer of a compound having one ethylenically unsaturated group in a molecule such as methyl methacrylate, 2-hydroxyethyl methacrylate, acrylic acid, styrene); and the like.

The above reaction of a polyol compound (c), a monocarboxylic acid (a) bearing a maleimide group and (meth) acrylic acid (b) is performed preferably at a ratio of 0.5 to 3 chemical equivalents, particularly preferably at a ratio of 1.0 to 1.5 chemical equivalents of the total carboxyl group in the above (a) and (b) components based on 1 chemical equivalent of the hydroxyl group in the polyol compound (c). As an esterification catalyst to promote a dehydration reaction, sulfuric acid, p-toluenesulfonic acid, methanesulfonic acid or the like are preferably used. An organic solvent that is insoluble in water is preferably used as a reaction solvent so as to remove water formed during the reaction from the reaction system. Specific examples of such organic solvent include benzene, toluene, xylene, cyclohexane, n-hexane, n-heptane and the like. A polymerization inhibitor is preferably added so as to prevent polymerization during the reaction. Specific examples of the polymerization inhibitor that can be used include hydroquinone, methyl hydroquinone, p-methoxyphenol, phenothiazine and the like. Raction temperature is preferably 80° C. to 130° C., depending on a reaction solvent to be used, and reaction time is preferably 5 to 20 hours.

With regard to ratios of amounts of the component (a) and the component (b) to be used, the component (a) is preferably 15 mole percents to 80 mole percents, and particularly preferably 20 mole percents to 75 mole percents, while the component (b) is preferably 20 mole percents to 85 mole percents, and particularly preferably 25 mole percents to 80 mole percents, based on 1 mole of the total amount of the components (a) and (b).

Specific examples of the maleimide compound (A2) include a compound obtained by an esterification reaction between the compound (d) bearing one (meth)acrylate group and one hydroxyl group in the molecule and the monocarboxylic acid (e) bearing a maleimide group, and the like.

Specific examples of the compound (d) bearing one (meth)acrylate group and one hydroxyl group in the molecule include 2-hydroxyethyl (meth)acrylate, 2-hydroxypropyl (meth)acrylate, 4-hydroxybutyl (meth)acrylate, poly (n≈2 to 10) ethylene glycol mono(meth)acrylate, an adduct of 2-hydroxyethyl (meth)acrylate with $\epsilon$-caprolactone, 2-hydroxy-3-phenyloxypropyl (meth)acrylate, 2-hydroxy-3-(2-perfluorohexyl)ethoxy-propyl (meth)acrylate, cyclohexane-1,4-dimethanol mono(meth)acrylate and the like. Specific examples of the monocarboxylic acid (e) bearing a maleimide group include the same compounds as those of the above monocarboxylic acid (a) bearing a maleimide group.

The above reaction of the compound (d) bearing one (meth)acrylate group and one hydroxyl group in the molecule and a monocarboxylic acid (e) bearing a maleimide group is usually performed preferably at a ratio of 0.5 to 1.5 chemical equivalents, particularly preferably at a ratio of 0.95 to 1.1 chemical equivalents of the carboxyl group in the monocarboxylic acid (e) bearing a maleimide group, based on 1 chemical equivalent of the hydroxyl group in the compound (d) bearing one (meth)acrylate group and one hydroxyl group in a molecule. As an esterification catalyst to promote a dehydration reaction, sulfuric acid, p-toluenesulfonic acid, methanesulfonic acid or the like are preferably used. An organic solvent that is insoluble in water and advantageous for removing water formed during the reaction from the reaction system is preferably used as a reaction solvent. Specific examples of the organic solvent that can be used include benzene, toluene, xylene, cyclohexane, n-hexane, n-heptane and the like. A polymerization inhibitor is preferably added so as to prevent polymerization during the reaction. Specific examples of the polymerization inhibitor that can be used include hydroquinone, methyl hydroquinone, p-methoxyphenol, phenothiazine and the like. Reaction temperature is preferably 80° C. to 150° C., and reaction time is preferably 5 to 20 hours.

Specific examples of the maleimide compound (A3) include a compound obtained by an esterification reaction between the above dioxane compound (d) represented by the general formula (1) and the monocarboxylic acid (e) bearing a maleimide group.

Specific examples of the above dioxane compound (d) represented by the general formula (1) include a compound obtained by dehydration-condensation of 1,3-propanediols (j) wherein a hydrogen atom bonded to a carbon atom may be substituted with an organic group, and hydroxypivalylaldehyde (k). Specific examples of the 1,3-propanediols (j) wherein a hydrogen atom bonded to a carbon atom may be substituted with an organic group include 1,3-propanediol, neopentyl glycol, 2,2-diethyl-1,3-propanediol, 2-butyl-2-ethyl-1,3-propanediol, 1,3-butanediol, 2-ethyl-1,3-hexanediol, 1,1-dimethyl-3-methyl-1,3-propanediol, trimethylolethane, trimethylolpropane, trimethyloloctane, pentaerythritol and the like.

The reaction of these 1,3-propanediols (j) and hydroxypivalylaldehyde (k) is preferably performed in approximately an equimolar amount of each reactant. An organic solvent suitable for removing water formed during the reaction from the reaction system includes, for example, benzene, toluene, cyclohexane, n-hexane and n-butane. They can be used alone or in combination of two or more kinds thereof.

Reaction temperature is preferably 80 to 150° C., and reaction time is preferably 0.5 to 15 hours.

Specific examples of the monocarboxylic acid (g) bearing a maleimide group include the same compounds to those of the above monocarboxylic acid (a) bearing a maleimide group.

The above reaction of the dioxane compound (d) and the monocarboxylic acid (e) bearing a maleimide group is performed preferably at a ratio of 0.5 to 1.5 chemical equivalents, particularly preferably at a ratio of 0.95 to 1.1 chemical equivalents of the carboxyl group in the monocarboxylic acid (e) bearing a maleimide group, based on 1 chemical equivalent of the hydroxyl group in the dioxane compound (d). As an esterification catalyst to promote a dehydration reaction, sulfuric acid, p-toluenesulfonic acid, methanesulfonic acid or the like is preferably used. An organic solvent that is insoluble in water and suitable for removing water formed during the reaction from the reaction system is preferably used as a reaction solvent. Specific examples of the organic solvent that can be used include benzene, toluene, xylene, cyclohexane, n-hexane, n-heptane and the like. A polymerization inhibitor is preferably added so as to prevent polymerization during the reaction. Specific examples of the polymerization inhibitor that can be used include hydroquinone, methyl hydroquinone, p-methoxyphenol, phenothiazine and the like. Reaction temperature is preferably 80 to 150° C., and reaction time is preferably 5 to 20 hours.

Specific examples of the maleimide compound (A4) include a compound obtained by an esterification reaction between the compound (h) bearing one or two hydroxyl groups and a fluorine atom in the molecule and a monocarboxylic acid (i) bearing a maleimide group.

Specific examples of the compound (h) bearing one or two hydroxyl groups and a fluorine atom in the molecule include a monool compound (h-1) such as 2,2,2-trifluoroethanol, 2,2,3,3,3-pentafluoropropanol, 6-(perfluoroethyl) hexanol, 1H,1H-heptafluorobutanol, 2-perfluorobutylethanol, 3-perfluorobutyl-2-propene-1-ol, 3-perfluorobutyl-2-iodopropanol, 6-(perfluorobutyl)hexanol, 2-perfluoropropoxy-2,3,3,3-tetrafluoropropanol, 2-(perfluorohexyl)ethanol, 3-(perfluorohexyl)propanol, 2-(perfluorooctyl)ethanol, 6-(perfluorooctyl)hexanol, 6-(perfluoro-1-methylethyl) hexanol, 2-(perfluoro-3-methylbutyl)ethanol, 2-(perfluoro-5-methylhexyl)-2-iodopropanol, 1H,1H,3H-tetrafluoropropanol, 1H,1H,5H-octafluoropentanol, 2-fluoroethanol, and 2,2-bis(trifluoromethyl)propanol; a diol compound (h-2) such as 3-(2-perfluorohexyl)ethoxy-1,2-dihydroxypropane, 3-(2-perfluoro-n-octyl)ethoxy-1,2-dihydroxypropane, 3-(1H,1H-pentadecafluoro-1-octyl)oxy-1,2-dihydroxypropane, 3-(1H,1H-perfluoro-1-lauryl)oxy-1,2-dihydroxypropane, 3-(2,2-2-trifluoroethyl)oxy-1,2-dihydroxypropane, 3-(hexafluoropropyl)oxy-1,2-dihydroxypropane, 3-(2-perfluoro-n-butyl)ethoxy-1,2-dihydroxypropane, 3-(4,4,4-trifluoro-3,3-dimethoxybutyl)oxy-1,2-dihydroxypropane, 3-(n-perfluoro-n-octyl) methyloxy-1,2-dihydroxypropane, 3-(perfluoro-n-octyl)-1,2-dihydroxypropane, 3-(perfluoro-n-butyl)-1,2-dihydroxypropane, 3-(perfluoro-n-hexyl)-1,2-dihydroxypropane, 1,4-bis(1,2-dihydroxypropyl)-perfluoro-n-butane, 2,2,3,3,4,4,5,5-octafluoro-1,6-hexanediol, 3,3,4,4,5,5,6,6-octafluorooctane-1,8-diol, 2,2,3,3-tetrafluoro-1,4-butanediol, 2,2,3,3,4,4-hexafluoro-1,5-pentanediol, 2,2,3,3,4,4,5,5-octafluoro-1,6-hexanediol, 2,2,3,3,4,4,5,5,6,6,7,7-decafluoro-1,8-octanediol:

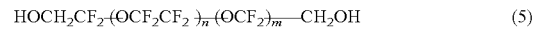

$$HOCH_2CF_2\text{-}(OCF_2CF_2)_n\text{-}(OCF_2)_m\text{---}CH_2OH \quad (5)$$

(wherein, n and m are each a number of 1 to 50); and a reaction product (h-3) of a hydroxyl group of the monool compound (h-1) or the diol compound (h-2) and an alkylene oxide (for example, ethylene oxide, propylene oxide and butylene oxide); and the like.

Specific examples of the monocarboxylic acid (i) bearing a maleimide group include the same compounds as those of the above monocarboxylic acid (a) bearing a maleimide group.

The above reaction of the compound (h) bearing one or two hydroxyl groups and a fluorine atom, and the monocarboxylic acid (i) bearing a maleimide group is performed preferably at a ratio of 0.5 to 1.5 chemical equivalents, particularly preferably at a ratio of 0.95 to 1.1 chemical equivalents of the carboxyl group in the monocarboxylic acid (i) bearing a maleimide group, based on 1 chemical equivalent of the hydroxyl group in the compound (h) bearing one or two hydroxyl groups and a fluorine atom. As an esterification catalyst to promote a dehydration reaction, sulfuric acid, p-toluenesulfonic acid, methanesulfonic acid or the like is preferably used. An organic solvent that is insoluble in water is preferably used as a reaction solvent to remove water formed during the reaction from the reaction system. Specific examples of the organic solvent that can be used include benzene, toluene, xylene, cyclohexane, n-hexane, n-heptane and the like. A polymerization inhibitor is preferably added so as to prevent polymerization during the reaction. Specific examples of the polymerization inhibitor that can be used include hydroquinone, methyl hydroquinone, p-methoxyphenol, phenothiazine and the like.

Reaction temperature is preferably 80 to 180° C. depending on a reaction solvent to be used, and reaction time is preferably 5 to 20 hours.

A resin composition of the present invention preferably contains a polymerizable compound (B) besides the above compounds (A1) to (A4).

Specific examples of the polymerizable compound (B) include the compound (F-1) bearing a (meth)acryloyl group, the compound (F-2) bearing a vinyl ether group, a compound bearing an N-vinyl group, a maleimide compound other than (A1), (A2), (A3) and (A4), a (meth)acrylamido compound, an unsaturated polyester and the like.

Specific examples of the compound (F-1) bearing a (meth)acryloyl group that can be used for a resin composition of the present invention include, but are not limited to, a (poly)ester (meth)acrylate (F-1-1); urethane (meth)acrylate (F-1-2); epoxy (meth)acrylate (F-1-3); (poly)ether (meth)acrylate (F-1-4); alkyl (meth)acrylate or alkylene (meth)acrylate (F-1-5); (meth)acrylate (F-1-6) having an aromatic ring; (meth)acrylate (F-1-7) having an aliphatic ring structure and the like.

With regard to the compound (F-1) bearing a (meth) acryloyl group that can be used for a resin composition of the present invention, the (poly)ester (meth)acrylate (F-1-1) is used as a general term for (meth)acrylates having at least one ester linkage in the main chain thereof; the urethane (meth)acrylate (F-1-2) is used as a general term for (meth) acrylates having at least one urethane linkage in the main chain thereof; the epoxy (meth)acrylate (F-1-3) is used as a general term for (meth)acrylates obtained by reacting a mono- or poly-functional epoxy compound and a (meth) acrylic acid; the (poly)ether (meth)acrylate (F-1-4) is used as a general term for (meth)acrylates having at least one ether linkage in the main chain thereof; the alkyl (meth)acrylate or the alkylene (meth)acrylate (F-1-5) is used as a general term for (meth)acrylates wherein the main chain is a linear alkyl or a branched alkyl and may have a halogen atom and/or a hydroxyl group in the linear chain or the terminal thereof; the (meth)acrylate (F-1-6) having an aromatic ring is used as a general term for (meth)acrylates having an aromatic ring in the main or side chain thereof; the (meth)acrylate (F-1-7) having an alicyclic structure is used as a general term for (meth)acrylates having an aliphatic ring structure optionally containing an oxygen atom or a nitrogen atom as a structural unit in the main or side chain thereof.

The (poly)ester (meth)acrylate (F-1-1) that can be used for a resin composition of the present invention includes, but is not limited to, for example, monofunctional (poly)ester (meth)acrylates such as caprolactone-denatured 2-hydroxyethyl (meth)acrylate, ethylene oxide- and/or propylene oxide-denatured phthalate (meth)acrylate, ethylene oxide-denatured succinate (meth)acrylate and caprolactone-denatured tetrahydrofurfuryl (meth)acrylate; hydroxypivalate neopentyl glycol di(meth)acrylate, caprolactone-denatured hydroxypivalate neopentyl glycol di(meth)acrylate, epichlorohydrin-denatured phthalate di(meth)acrylate; a mono, di or tri(meth)acrylate of a triol obtained by adding one or more moles of a cyclic lactone compound such as ε-caprolactone, γ-butyrolactone and δ-valerolactone to one mole of trimethylolpropane or glycerin; a mono(meth)acrylate or a poly (meth)acrylate of a polyhydric alcohol such as a triol, a tetraol, a pentaol or a hexaol, such as a mono, di, tri or tetra(meth)acrylate of a triol obtained by adding one or more moles of a cyclic lactone compound such as ε-caprolactone, γ-butyrolactone and δ-valerolactone to one mole of pentaerythritol or ditrimethylolpropane and a mono or poly (meth)acrylate of a triol obtained by adding one or more moles of a cyclic lactone compound such as ε-caprolactone, γ-butyrolactone and δ-valerolactone to one mole of dipentaerythritol; a (meth)acrylate of a polyesterpolyol obtained by reacting a diol component of (poly)ethylene glycol, (poly)propylene glycol, (poly)tetramethylene glycol, (poly) butylene glycol, 3-methyl-1,5-pentanediol, hexanediol or the like, and a polybasic acid such as maleic acid, fumaric acid, succinic acid, adipic acid, phthalic acid, isophthalic acid, hexahydrophthalic acid, tetrahydrophthalic acid, a dimmer acid, sebacic acid, azelaic acid and 5-sodiumsulfoisophthalic acid, as well as an anhydride thereof; and polyfunctional (poly)ester (meth)acrylates such as a (meth) acrylate of a cyclic lactone-denatured polyesterdiol comprising the above diol component, polybasic acid as well as anhydride thereof, and ε-caprolactone, γ-butyrolactone and δ-valerolactone.

The urethane (meth)acrylate (F-1-2) that can be used for a resin composition of the present invention is a general term for (meth)acrylates obtained by reacting a hydroxyl compound (F-1-2-(1)) bearing at least one (meth)acryloyl group and an isocyanate compound (F-1-2-(2)).

Specific examples of the hydroxyl compound (F-1-2-(1)) bearing at least one (meth)acryloyl group include a (meth) acrylate compound bearing various kinds of hydroxyl groups such as 2-hydroxyethyl (meth)acrylate, 2-hydroxypropyl (meth)acrylate, 2-hydroxybutyl (meth)acrylate, 4-hydroxyethyl (meth)acrylate, cyclohexanedimethanol mono(meth)acrylate, polyethylene glycol mono(meth)acrylate, polypropylene glycol mono(meth)acrylate, pentaerythritol tri(meth)acrylate and 2-hydroxy-3-phenoxypropyl (meth)acrylate; a compound obtained by a ring opening reaction of the above (meth)acrylate compound having a hydroxyl group and ε-caprolactone.

Specific examples of the isocyanate compound (F-1-2-(2)) include aromatic diisocyanates such as p-phenylene diisocyanate, m-phenylene diisocyanate, p-xylene diisocyanate, m-xylene diisocyanate, 2,4-tolylene diisocyanate, 2,6-tolylene diisocyanate, 4,4'-diphenylmethane diisocyanate and naphthalene diisocyanate; aliphatic or alicyclic diisocyanates such as isophorone diisocyanate, hexamethylene diisocyanate, 4,4'-dicyclohexylmethane diisocyanate, hydrogenated xylene diisocyanate, norbornene diisocyanate and lysine diisocyanate; a polyisocyanate such as a biuret compound of one or more isocyanate monomers or an isocyanate compound trimerizing the above diisocyanate compound; a polyisocyanate obtained by a urethane reaction of the above isocyanate compound and the above polyol compound.

The epoxy (meth)acrylate (F-1-3) that can be used for a resin composition of the present invention is a general term for (meth)acrylates obtained by reacting an epoxy resin having a mono- or poly-functional epoxy group and (meth) acrylic acid. As the epoxy resin, which is a raw material of the epoxy (meth)acrylate, any compound (resin) having an epoxy group can be used. Examples of the epoxy resin that can be used include a novolac type epoxy resin (This type includes, for example, a resin obtained by reacting novolac resins obtained by reacting phenols such as phenol, cresol, a halogenated phenol and/or an alkylphenol and formaldehyde in the presence of an acidic catalyst, and epichlorohydrin and/or methyl epichlorohydrin, and commercial products thereof include EOCN-103, FOCN-104S, EOCN-1020, EOCN-1027, EPPN-201 and BREN-S produced by Nippon Kayaku Co., Ltd.; DEN-431 and DEN-439 produced by The Dow Chemical Company; N-730, N-770, N-865, N-665, N-673 and VH-4150 produced by Dainippon Ink and Chemicals, Inc. and the like); a bisphenol type epoxy resin (This type includes, for example, a resin obtained by reacting bisphenols such as bisphenol A, bisphenol F, bisphenol S and tetrabromobisphenol A, and epichlorohydrin and/or methyl epichlorohydrin, and a resin obtained by reacting a condensed product of diglycidyl ether of bisphenol A and the above bisphenols, and epichlorohydrin and/or methyl epichlorohydrin, and commercial products thereof include Epicoat 1004 and Epicoat 1002 produced by Japan Epoxy Resins Co., Ltd., DER-330 and DER-337 produced by The Dow Chemical Company and the like); a trisphenolmethane type epoxy resin (This type includes, for example, a resin obtained by reacting trisphenolmethane or triscresolmethane and epichlorohydrin and/or methyl epichlorohydrin, and commercial products thereof include EPPN-501 and EPPN-502 produced by Nippon Kayaku Co., Ltd. and the like); tris(2,3-epoxypropyl) isocyanate; biphenyl diglycidyl ether; alicyclic epoxy resins such as Celoxide 2021 produced by Daicel Chemical Industries, Ltd., Epomic VG-3101 produced by Mitsui Chemicals Inc., E-1031S produced by Japan Epoxy Resins Co., Ltd., TETRAD-X and TETRAD-C produced by Mitsubishi Gas Chemical Co., Inc., EPB-13 and EPB-27 produced by Nippon Soda Co., Ltd.; and epoxy resins that have an amino group or a special structure. Preferable examples among these include a cresol-novolac type epoxy resin, a phenol-novolac type epoxy resin and the like.

The (poly)ether (meth)acrylate (F-1-4) that can be used for a resin composition of the present invention includes, for example, monofunctional (poly)ether (meth)acrylates such as butoxyethyl (meth)acrylate, butoxytriethylene glycol (meth)acrylate, epichlorohydrin-denatured butyl (meth) acrylate, dicyclopentenyloxyethyl (meth)acrylate, 2-ethoxyethyl (meth)acrylate, ethylcarbitol (meth)acrylate, phenoxyethyl (meth)acrylate and nonylphenoxy polyethylene glycol (meth)acrylate; alkylene glycol di(meth)acrylates such as polyethylene glycol di(meth)acrylate, polypropylene glycol di(meth)acrylate, polybutylene glycol di(meth)acrylate and polytetramethylene glycol di(meth)acrylate; poly-functional (meth)acrylates derived from (meth)acrylic acid and polyvalent hydroxy compounds such as hydrocarbon-based polyols such as a copolymer of ethylene oxide and propylene oxide, a copolymer of propylene glycol and tetrahydrofuran, polyisobutylene glycol, hydrogenated polyisoprene glycol, polybutadiene glycol and hydrogenated polybutadiene glycol; a di(meth)acrylate of a diol obtained by adding one or more moles of cyclic ethers such as ethylene oxide, propylene oxide and butylenes oxide to one mole of neopentyl glycol; a di(meth)acrylate of alkylene oxide-denatured bisphenols such as bisphenol A, bisphenol F and bisphenol S; a di(meth)acrylate of alkylene oxide-denatured hydrogenated bisphenols such as hydrogenated bisphenol A, hydrogenated bisphenol F and hydrogenated bisphenol S; a mono, di or tri(meth)acrylate of a triol obtained by adding one or more moles of cyclic ethers such as ethylene oxide, propylene oxide and butylene oxide to one mole of trimethylolpropane or glycerin; a mono, di, tri or tetra(meth)acrylate of a triol obtained by adding one or more moles of cyclic ethers such as ethylene oxide, propylene oxide and butylene oxide to one mole of pentaerythritol or ditrimethylolpropane; and polyfunctional (poly)ether (meth)acrylates such as 3 to 6 functional (meth)acrylates of a hexaol obtained by adding one or more moles of cyclic ethers such as ethylene oxide, propylene oxide and butylene oxide to one mole of dipentaerythritol.

The alkyl (meth)acrylate or the alkylene (meth)acrylate (F-1-5) that can be used for a resin composition of the present invention includes, for example, monofunctional (meth)acrylates such as octyl (meth)acrylate, isooctyl (meth) acrylate, decyl (meth)acrylate and dodecyl (meth)acrylate; di(meth)acrylates of hydrocarbon diols such as ethylene glycol di(meth)acrylate, propylene glycol di(meth)acrylate, 1,4-butanediol di(meth)acrylate, 1,6-hexanediol di(meth) acrylate, neopentyl glycol di(meth)acrylate, 2-methyl-1,8-octanediol di(meth)acrylate, 1,9-nonanediol di(meth)acrylate and 1,10-decanediol di(meth)acrylate; mono or poly (meth)acrylates of polyhydric alcohols such as a triol, a tetraol and a hexaol, such as a mono(meth)acrylate, a di(meth)acrylate or a tri(meth)acrylate of trimethylolpropane (hereinafter, "poly" is used as a general term for a polyfunction such as di, tri and tetra), a mono(meth)acrylate or a poly(meth)acrylate of glycerin, a mono or poly(meth) acrylate of pentaerythritol, a mono or poly(meth)acrylate of ditrimethylolpropane, a mono or poly(meth)acrylate of dipentaerythritol; (meth)acrylic acid having a hydroxyl group such as 2-hydroxyethyl (meth)acrylate, 2-hydroxypropyl (meth)acrylate and 4-hydroxybutyl (meth)acrylate.

The (meth)acrylate (F-1-6) having an aromatic ring that can be used for a resin composition of the present invention includes, but is not limited to, for example, monofunctional (meth)acrylates such as phenyl (meth)acrylate and benzyl (meth)acrylate; di(meth)acrylates such as bisphenol A di(meth)acrylate and bisphenol F di(meth)acrylate.

The (meth)acrylate (F-1-7) having an alicyclic structure that can be used for a resin composition of the present invention includes, but is not limited to, for example, monofunctional (meth)acrylates having an alicyclic structure such as cyclohexyl (meth)acrylate, cyclopentyl (meth) acrylate, isobornyl (meth)acrylate and dicyclopentenyl (meth)acrylate; di(meth)acrylates of hydrogenated bisphenols such as hydrogenated bisphenol A and hydrogenated bisphenol F; polyfunctional (meth)acrylates having a ring structure such as tricyclodecanedimethylol di(meth)acrylate; and an alicyclic (meth)acrylate having an oxygen atom or the like in the structure thereof such as tetrafurfuryl (meth)acrylate.

In addition to the above compounds, the compound (F-1) having a (meth)acryloyl group that can be used for a resin composition of the present invention includes, for example, a poly(meth)acrylic polymer (meth)acrylate such as a reaction product of a (meth)acrylic polymer and glycidyl (meth) acrylate, or a reaction product of a glycidyl (meth)acrylate polymer and (meth)acrylic acid; a (meth)acrylate having an amino group such as dimethylaminoethyl (meth)acrylate; an isocyanuric (meth)acrylate such as tris(meth)acryloxyethyl isocyanurate; a (meth)acrylate having a polysiloxane skeleton; polybutadiene (meth)acrylate; and melamine (meth) acrylate.

The compound (F-2) bearing a vinyl ether group that can be used for a resin composition of the present invention is classified roughly into an alkyl vinyl ether (F-2-1) wherein the other end thereof may be substituted with a halogen atom or a hydroxyl group; a cycloalkyl vinyl ether (F-2-2) wherein the other end thereof may be substituted with a halogen atom or a hydroxyl group; a mono, di and polyvinyl ether (B-2-3) that has a structure where the vinyl ether group is bonded to an alkylene group and also bonded to at least one group selected from a group consisting of an alkyl group, a cycloalkyl group and an aromatic group that may have a substitute, by at least one linkage selected from a group consisting of an ether linkage, a urethane linkage and an ester linkage, and the like, but is not limited to these.

The above alkyl vinyl ether (F-2-1) includes, but is not limited to, for example, hydroxymethyl vinyl ether, chloromethyl vinyl ether, hydroxyethyl vinyl ether, 2-chloroethyl vinyl ether, 1,4-butanediol divinyl ether, 1,6-hexanediol divinyl ether, 4-hydroxybutyl vinyl ether, trimethylolpropane trivinyl ether and pentaerythritol tetravinyl ether.

The above cycloalkyl vinyl ether (F-2-2) includes, but is not limited to, for example, 2-hydroxycyclopropyl vinyl ether, cyclohexyl vinyl ether, cyclohexanediol monovinyl ether or cyclohexanediol divinyl ether, and cyclohexanediol monovinyl ether or cyclohexanediol divinyl ether.

The above mono, di and polyvinyl ethers (F-2-3) include a compound (F-2-3-(1)) having an ether linkage, a compound (F-2-3-(2)) having a urethane linkage, a compound (F-2-3-(3)) having an ester linkage and the like.

The compound (F-2-3-(1)) having an ether linkage includes ethylene glycol methylvinyl ether, diethylene glycol divinyl ether, triethylene glycol divinyl ether, propylene glycol methylvinyl ether, dipropylene glycol divinyl ether, ditetramethylene glycol divinyl ether and the like.

The compound (F-2-3-(2)) having a urethane linkage includes a compound that can be obtained by a urethane reaction of a monovinyl ether (m) of a (poly)alkylene glycol having one hydroxyl group in a molecule and a compound (n) having at least one isocyanate group in a molecule. The monovinyl ether (m) of the (poly)alkylene glycol having one hydroxyl group in a molecule includes, for example, 2-hydroxyethyl vinyl ether, 4-hydroxybutyl vinyl ether and polyethylene glycol monovinyl ether. On the other hand, the compound (n) having at least one isocyanate group in a molecule includes, for example, the above isocyanate compound (F-1-2-(2)).

The compound (F-2-3-(3)) having an ester linkage can be obtained by an esterification reaction accompanied by dehydrohaloganation between the above monovinyl ether (m) of a (poly)alkylene glycol having one hydroxyl group in a molecule and a compound (l) having at least one carboxylic halide in a molecule. The compound (l) having at least one carboxylic halide in a molecule includes a known carboxylic halide such as carboxylic chloride and carboxylic bromide. Specific examples of the carboxylic acids include acetic acid, propionic acid, isophthalic acid, terephthalic acid, maleic acid, adipic acid, a dimmer acid, sebacic acid, tetrahydrophthalic acid, azelaic acid and the like.

The compound bearing an N-vinyl group that can be used for a resin composition of the present invention includes, for example, N-vinylpyrrolidone, N-vinylcaprolactam, N-vinylformamido and N-vinylacetamido.

The maleimide compound other than the above (A1) to (A4) that can be used for a resin composition of the present invention includes, but is not limited to, for example, monofunctional aliphatic maleimides such as N-n-butylmaleimide, N-hexylmaleimide, 2-maleimideethyl-ethyl carbonate, 2-maleimideethyl-propyl carbonate and N-ethyl-(2-maleimideethyl) carbamate; monofunctional alicyclic maleimides such as N-cyclohexylmaleimide; aliphatic bismaleimides such as N,N-hexamethylenebismaleimide, polypropylene glycol bis(3-maleimidepropyl) ether and bis(2-maleimideethyl) carbonate; an alicyclic bismaleimide such as 1,4-dimaleimide cyclohexane and isophorone bisurethane bis(N-ethylenemaleimide); and a (poly)ester (poly)maleimide compound obtained by an esterification reaction between a carboxymaleimide derivative such as a maleimide compound obtained by an esterification reaction between maleimide acetic acid and polytetramethylene glycol and a maleimide compound obtained by an esterification reaction between maleimide caproic acid and pentaerythritol added with tetraethylene oxide, and various kinds of (poly)ols.

The (meth)acrylamide compound that can be used for a resin composition of the present invention includes, for example, monofunctional (meth)acrylamides such as acryloyl morpholine and N-isopropyl(meth)acrylamide; and polyfunctional (meth)acrylamides such as methylenebis (meth)acrylamide.

The unsaturated polyester compound that can be used for a resin composition of the present invention includes, for example, fumarates such as dimethyl maleate and diethyl maleate; and an esterification product of a polyvalent unsaturated carboxylic acid such as maleic acid and fumaric acid, and a polyhydric alcohol.

The above polymerizable compound (B) that can be used for a resin composition of the present invention is not limited to the compounds described above, but one or more kinds of the compounds that are copolymerizable with the above (A1), (A2), (A3) or (A4) can be used in combination without particular limitation.

In a resin composition of the present invention, a ratio of (B) to each of (A1) to (A4) to be used is not particularly limited, but preferably 10 to 2,000 parts by weight, and particularly preferably 50 to 1,000 parts by weight of the (B) component are used for every 100 parts by weight of each of (A1) to (A4) components.

The resin composition of the present invention is cured by irradiation of ultraviolet light or visible light in the absence of a photoinitiator, but can be also cured by adding a photoinitiator (G) so as to perform a curing reaction more efficiently. The photoinitiator (G) that can be used can be classified roughly into two kinds of an intra-molecular linkage cleavage type and an intra-molecular hydrogen abtraction type.

The photoinitiator of the intra-molecular linkage cleavage type includes, for example, acetophenone type of compounds such as diethoxyacetophenone, 2-hydroxy-2-methyl-1-phenylpropane-1-one, benzildimethyl ketar, 1-(4-isopropylphenyl)-2-hydroxy-2-methylpropane-1-one, 4-(2-hydroxyethoxy)phenyl-(2-hydroxy-2-propyl) ketone, 1-hydroxycyclohexylphenyl ketone, 2-methyl-2-morpholino (4-thiomethylphenyl)propane-1-one and 2-benzil-2-dimethylamino-1-(4-morpholinophenyl)butanone; benzoin type of compounds such as benzoin, benzoin methyl ether and benzoin isopropyl ether; acylphosphine oxide type of compounds such as 2,4,6-trimethylbenzoin diphenylphosphine oxide; benzil, and methylphenylguoxy ester.

The photoinitiator of the intra-molecular hydrogen abtraction type includes, for example, benzophenone type of compounds such as benzophenone, 4-benzoyl-4'-methyldiphenylsulfide and an acrylated benzophenone; thioxantone type of compounds such as 2-isopropylthioxantone, 2,4-diethoxythioxantone and 2-chlorothioxantone; aminobenzophenone type of compounds such as 4,4'-diethylaminobenzophenone; 10-butyl-2-chloroacridone; 2-ethylanthraquinone; and canphorquinone.

An amount of the photoinitiator to be used is preferably in a range of 0.01 to 10.00% by weight in the resin composition.

The resin composition obtained in the present invention is cured by irradiation of ultraviolet light or visible light in the absence of a photoinitiator, but can be also cured by using an accelerator in combination so as to perform a curing reaction more efficiently.

The accelerator includes, for example, amines such as triethanolamine, methyldiethanolamine, triisopropanolamine, methyl 4-dimethylaminobenzoate ester, ethyl 4-dimethylaminobenzoate ester and isoamyl 4-dimethylaminobenzoate ester.

An amount of the accelerator to be used is preferably in a range of 0.01 to 10.00% by weight in the resin composition.

The resin composition obtained in the present invention can be added with a non-reactive compound, inorganic filler, organic filler, coupling agent, tackifier, antifoaming agent, leveling agent, plasticizer, antioxidant, ultraviolet absorber, flame-retardant, pigment, dye or the like, depending on uses thereof.

Specific examples of the above non-reactive compound include a liquid or solid oligomer and resin with little or no reactivity, such as an alkyl (meth)acrylate copolymer, epoxy resin, liquid polybutadiene, dicyclopentadiene derivative, saturated polyester oligomer, xylene resin, polyurethane polymer, ketone resin, diallyl phthalate polymer (DAP resin), petroleum resin, rosin resin, fluorinated oligomer and silicon-based oligomer, but are not limited to these.

The above inorganic filler includes, for example, silicon dioxide, silicon oxide, calcium carbonate, calcium silicate, magnesium carbonate, magnesium oxide, talc, kaolin clay, calcined clay, zinc oxide, zinc sulfate, aluminum hydroxide, aluminum oxide, glass, mica, barium sulfate, alumina white, zeolite, silica balloon and glass balloon. These inorganic fillers can bear a functional group such as a halogen atom, an epoxy group, a hydroxyl group and a thiol group by adding or reacting with a silane coupling agent, a titanate type of coupling agent, an aluminum type of coupling agent, a zirconate type of coupling agent or the like.

The above organic filler includes, for example, a benzoguanamine resin, silicone resin, low-density polyethylene, high-density polyethylene, polyolefin resin, ethylene-acrylate copolymer, polystyrene, acrylic copolymer, polymethyl methacrylate resin, fluorinated resin, nylon 12, nylon 6/66, phenol resin, epoxy resin, urethane resin and polyimide resin.

The coupling agent includes, for example, a silane coupling agent such as γ-glycidoxypropyltrimethoxysilane and γ-chloropropyltrimethoxysilane; a titanate type of coupling agent such as tetra(2,2-diallyloxymethyl-1-butyl)bis(ditridecyl)phosphite titanate and bis(dioctyl pyrophosphate)ethylene titanate; an aluminum type of coupling agent such as acetoalcoxyaluminum diisopropylate; and a zirconium type of coupling agent such as acetylacetone-zirconium complex.

The additives that can be used in a resin composition of the present invention such as a tackifier, anti-form agent, leveling agent, plasticizer, antioxidant, ultraviolet absorber, flame-retardant, pigment and dye are not particularly limited, but any known and ordinary additive can be used within a range where curability and resin property thereof are not impaired.

Each component described above can be used only by mixing to obtain the resin composition of the present invention, and an order or a method of mixing is not particularly limited.

The resin composition of the present invention does not substantially require a solvent, but can also be diluted with ketones such as methyl ethyl ketone and methyl isobutyl ketone, acetates such as ethyl acetate and butyl acetate, aromatic hydrocarbons such as benzene, toluene and xylene, and other popular organic solvents.

The resin composition of the present invention can be polymerized by irradiation of ultraviolet light or visible light of 180 to 500 nm wavelength, and can be also cured by irradiation of energy rays other than ultraviolet light, or by heat.

Light source of ultraviolet or visible light of 180 to 500 nm wavelength includes, for example, a low-pressure mercury lamp, high-pressure mercury lamp, ultrahigh-pressure mercury lamp, metal halide lamp, chemical lamp, black light lamp, mercury-xenon lamp, excimer lamp, short arc lamp, helium-cadmium laser, argon laser, excimer laser and sunlight.

The resin composition of the present invention is useful for various kinds of coating materials for metals such as aluminum, iron and copper; plastics such as a vinyl chloride resin, acrylic resin, polycarbonate, polyethylene terephthalate, polyethylene and polypropylene; ceramics such as glass; lumbers, papers, printing papers, fibers or the like; as well as inks, surface treatment agents, binders, plastic materials, molding materials, laminated plates, adhesives, pressure-sensitive adhesives or the like.

More specific use of the resin composition of the present invention includes a use for an ink field such as litho and letterpress printing inks, flexographic inks, gravure printing inks and screen printing inks; luster and varnish field; paper coating material field; woodwork paint field; field of coating materials or printing inks for a beverage can; coating materials, printing inks or pressure-sensitive adhesives for soft packaging film; coating materials, printing inks, adhesives and pressure-sensitive adhesives for heat-sensitive paper and heat-sensitive film; coating materials for optical fiber and the like.

The resin composition of the present invention can be cured by irradiation of light in a practical dose even in the absence of a photoinitiator, and is characterized by a longer pot life, less odor and less irritation to the skin, and the cured article thereof is characterized by transparency, superior capability to form a film with high gel fraction and superior adhesion to various substrates.

The present invention will be described in more detail hereinbelow using Examples and Comparative Examples, but is not limited to these Examples.

EXAMPLE 1

Synthesis of (Meth)Acrylate Compound (A1) Bearing a Maleimide Group

In a 1-liter 4-necked flask equipped with an agitator, a thermometer, an air blowing pipe and a condenser-equipped separator, 68.1 g of pentaerythritol, 211.2 g of maleimide caproic acid, 48.0 g of acrylic acid, 1.0 g of hydroquinone, 168 g of toluene, 72 g of cyclohexane and 5 g of sulfuric acid were charged, and the solution was heated while agitating. Evaporated solvent and water formed were condensed in the condenser and separated in the separator. The water was removed from the system, while the solvent was recycled to the reaction system. When 30 g of condensed water were obtained after 5 hours of the reaction, the reaction mixture was cooled down, added with additional 52.8 g of acrylic acid, and then the reaction was restarted. The reaction was terminated when the total amount of water of 36 g was obtained. The reaction temperature was 92° C. to 102° C. The reaction mixture was transferred to a 2-liter separating funnel, dissolved in 210 g of toluene, 90 g of cyclohexane and 400 g of ethyl acetate, neutralized with 200 g of a 20% by weight aqueous solution of NaOH and then washed three times with 200 g of a 15% by weight aqueous solution of NaCl. The solvent was distilled off under a reduced pressure to obtain 268 g of a reaction product, of which the viscosity was 16.0 Pa.s at 25° C. The main component of the reaction product was confirmed to be the compound represented by the following structural formula from the results of NMR and LCMS analysis.

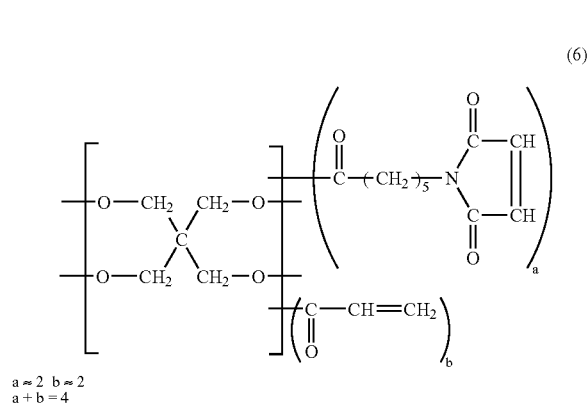

(6)

a ≈ 2 b ≈ 2
a + b = 4

EXAMPLE 2

In the similar apparatus as in Example 1, 127.1 g of dipentaerythritol, 816.8 g of maleimide caproic acid, 72.1 g of acrylic acid, 2 g of hydroquinone, 210 g of toluene, 90 g of cyclohexane and 7 g of sulfuric acid were charged, and the solution was reacted in the similar way. When 45 g of condensed water were obtained, the reaction solution was cooled down, added with additional 79.2 g of acrylic acid, and then the reaction was restarted. The reaction was terminated when the total amount of water of 54 g was obtained. The reaction temperature was 92° C. to 103° C. The reaction mixture was transferred to a 2-liter separating funnel, dissolved in 210 g of toluene, 90 g of cyclohexane and 500 g of ethyl acetate, neutralized with 300 g of a 20% by weight aqueous solution of NaOH and then washed three times with 300 g of a 15% by weight aqueous solution of NaCl. The solvent was distilled off under a reduced pressure to obtain 425 g of a reaction product, of which the viscosity was 173 Pa.s at 25° C. The main component of the reaction product was confirmed to be the compound represented by the following structural formula from the results of NMR and LCMS analysis.

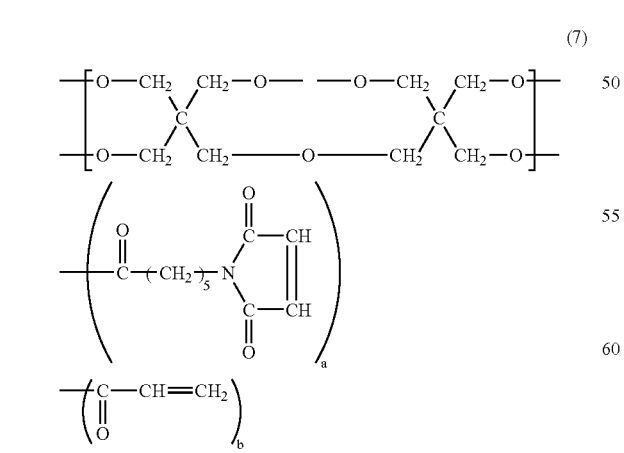

(7)

a ≈ 3 b ≈ 3
a + b = 6

EXAMPLE 3

Synthesis of Maleimide Compound (A2)

By the similar procedure as in Example 1, 116 g of 2-hydroxyethyl acrylate, 232 g of maleimide caproic acid, 1.6 g of hydroquinone, 300 g of toluene, and 5 g of sulfuric acid were charged, and the solution was heated while agitating. The dehydration reaction was continued at 95 to 130° C. for about 5 hours and terminated when 18 g of water formed were obtained. The reaction mixture was transferred to a separating funnel, dissolved in 500 g of toluene, neutralized with 50 g of a 20% aqueous solution of NaOH and then washed three times with 200 g of a 15% aqueous solution of NaCl. The solvent was distilled off under a reduced pressure to obtain 280 g of a reaction product. The refractive index (25° C.) of the reaction product was 1.4930 and the viscosity thereof was 0.22 Pa.s at 25° C. The main component of the reaction product was confirmed to be the compound represented by the following structural formula from the results of NMR and LCMS analysis.

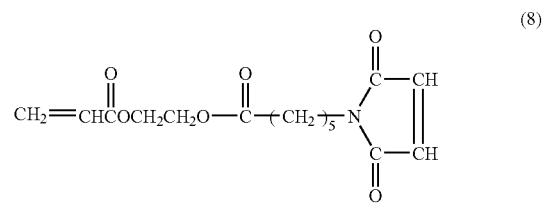

(8)

EXAMPLE 4

A reaction product of 310 g was obtained By the similar procedure as in Example 1 except that 116 g of 2-hydroxyethyl acrylate in Example 3 was replaced with 144 g of 4-hydroxybutyl acrylate. The refractive index (25° C.) of the reaction product was 1.4886 and the viscosity thereof was 0.14 Pa.s at 25° C. The main component of the reaction product was confirmed to be the compound represented by the following structural formula from the results of NMR and LCMS analysis.

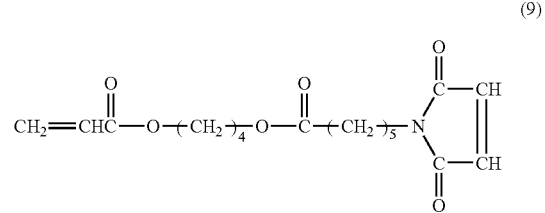

(9)

EXAMPLE 5

A reaction product of 385 g was obtained by the similar procedure as in Example 1 except that 116 g of 2-hydroxyethyl acrylate in Example 3 was replaced with 198 g of cyclohexane-1,4-dimethanol monoacrylate. The refractive index (25° C.) of the reaction product was 1.499 and the viscosity thereof was 0.69 Pa.s at 25° C. The main component of the reaction product was confirmed to be represented by the below structural formula according to the results of NMR and LCMS analysis.

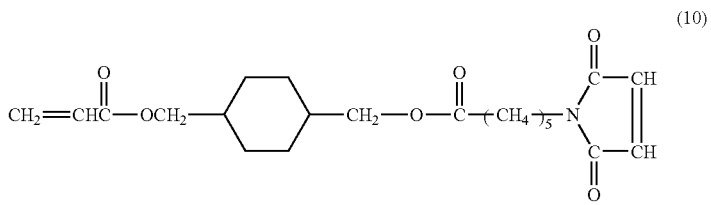

(10)

EXAMPLE 6

Synthesis of Maleimide Compound (A3)

By the similar procedure as in Example 1, 134 g of trimethylolpropane, 100 g hydroxypivalilaldehyde and 500 g toluene were charged, and the solution was heated while agitating. The dehydration reaction was continued at 95 to 130° C. for about 5 hours and terminated when 18 g of water formed were obtained and condensing of water stopped. The main component of the reaction product was confirmed to be the compound represented by the following structural formula from the results of NMR and LCMS analysis.

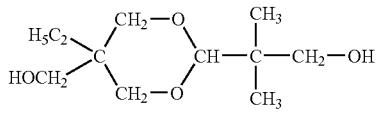

(11)

Subsequently, the reaction mixture was added with 422 g of maleimide caproic acid, 3 g of sulfuric acid and 3 g of hydroquinone and heated while agitating. The dehydration reaction was continued at 95 to 130° C. for about 5 hours and terminated when 36 g of water formed were obtained. The reaction mixture was transferred to a 5-liter separating funnel, dissolved in 1,000 g of toluene, neutralized with 100 g of a 20% aqueous solution of NaOH and then washed three times with 300 g of a 15% aqueous solution of NaCl. The solvent was distilled off under a reduced pressure to obtain 584 g of a reaction product. The refractive index (25° C.) of the reaction product was 1.502 and the viscosity thereof was 24.5 Pa.s at 25° C. The main component of the reaction product was confirmed to be the compound represented by the following structural formula from the results of NMR and LCMS analysis.

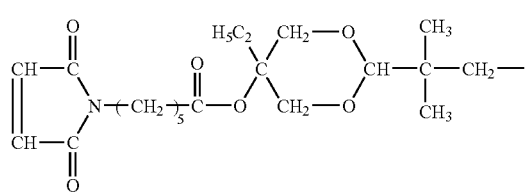

(12)

-continued

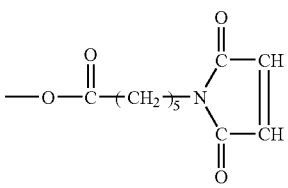

EXAMPLE 7

By the similar procedure as in Example 1, 104 g of neopentyl glycol, 100 g of hydroxypivalilaldehyde and 400 g of toluene were charged, and the solution was heated while agitating. The dehydration reaction was continued at 95 to 130° C. for about 4 hours and terminated when 18 g of water formed were obtained and condensing of water stopped. The main component of the reaction product was confirmed to be the compound represented by the following structural formula from the results of NMR and LCMS analysis.

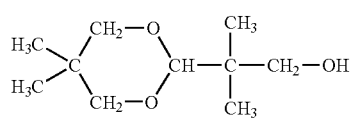

(13)

Subsequently, the reaction mixture was added with 211 g of maleimide caproic acid, 3 g of sulfuric acid and 3 g of hydroquinone and heated while agitating. The dehydration reaction was continued at 95 to 130° C. for about 5 hours and terminated when 18 g of water formed were obtained. The reaction mixture was transferred to a 2-liter separating funnel, dissolved in 500 g of toluene, neutralized with 100 g of a 20% aqueous solution of NaOH and then washed three times with 200 g of a 15% aqueous solution of NaCl. The solvent was distilled off under a reduced pressure to obtain 360 g of a reaction product. The refractive index (25° C.) of the reaction product was 1.493 and the viscosity thereof was 1.3 Pa.s at 25° C. The main component of the reaction product was confirmed to be the compound represented by the following structural formula from the results of NMR and LCMS analysis.

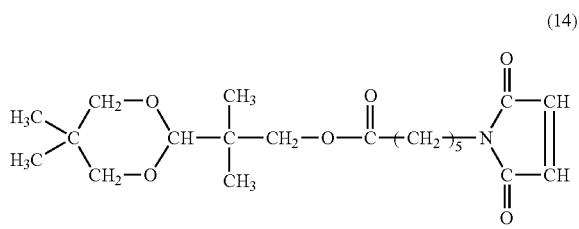

(14)

EXAMPLE 8

Synthesis Example of Maleimide Compound (A4)

By the similar procedure as in Example 1, 438 g of 3-(2-Perfluorohexyl)ethoxy-1,2-dihydroxypropane, 422 g of maleimide caproic acid, 10 g of sulfuric acid, 5 g of hydroquinone and 700 g of toluene were charged, and the solution was heated while agitating. The dehydration reaction was continued at 95 to 130° C. for about 5 to 10 hours and terminated when 36 g of water formed were obtained. The reaction mixture was transferred to a separating funnel, dissolved in 1,000 g of toluene, neutralized with 100 g of a 20% aqueous solution of NaOH and then washed three times with 300 g of a 15% aqueous solution of NaCl. The solvent was distilled off under a reduced pressure to obtain 692 g of a reaction product. The refractive index (25° C.) of the reaction product was 1.440 and the viscosity thereof was 3.3 Pa.s at 25° C. The main component of the reaction product was confirmed to be the compound represented by the following structural formula from the results of NMR and LCMS analysis.

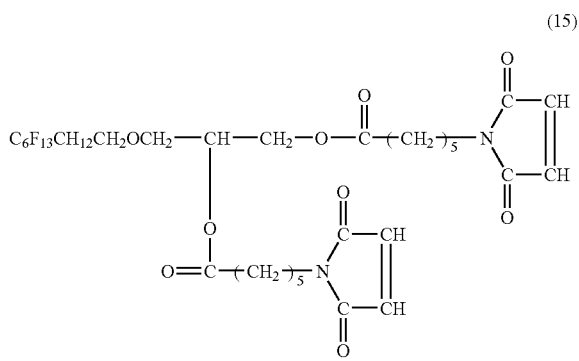

(15)

EXAMPLE 9

By the similar procedure as in Example 1, 464.1 g of 2-Perfluorooctylethanol, 211 g of maleimide caproic acid, 10 g of sulfuric acid, 5 g of hydroquinone and 400 g toluene were charged, and the solution was heated while agitating. The dehydration reaction was continued at 95 to 130° C. for about 5 to 10 hours and terminated when 18 g of water formed were obtained. The reaction mixture was transferred to a separating funnel, dissolved in 1,000 g of toluene, neutralized with 100 g of a 20% aqueous solution of NaOH and then washed three times with 300 g of a 15% aqueous solution of NaCl. The solvent was distilled off under a reduced pressure to obtain 580 g of a reaction product. The refractive index (25° C.) of the reaction product was 1.390.

The reaction product was a solid of which the melting point was 50° C. The main component of the reaction product was confirmed to be the compound represented by the following structural formula from the results of NMR and LCMS analysis.

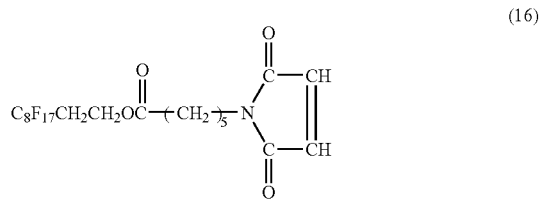

(16)

EXAMPLE 10

By the similar procedure as in Example 1, 290.2 g of 3,3,4,4,5,5,6,6-Octafluorooctane-1,8-diol, 422 g of maleimide caproic acid, 10 g sulfuric acid, 5 g of hydroquinone and 400 g of toluene were charged, and the solution was heated while agitating. The dehydration reaction was continued at 95 to 130° C. for about 5 to 10 hours and terminated when 18 g of water formed were obtained. The reaction mixture was transferred to a separating funnel, dissolved in 1,000 g of toluene, neutralized with 100 g of a 20% aqueous solution of NaOH and then washed three times with 300 g of a 15% aqueous solution of NaCl. The solvent was distilled off under a reduced pressure to obtain 649 g of a reaction product. The refractive index (25° C.) of the reaction product was 1.464. The reaction product was a solid of which the melting point was 52° C. The main component of the reaction product was confirmed to be the compound represented by the following structural formula from the results of NMR and LCMS analysis.

(17)

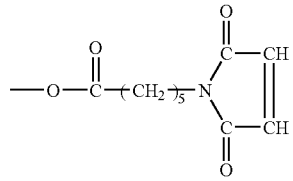

EXAMPLES 11 TO 22, COMPARATIVE EXAMPLES 1 AND 2

Resin compositions of the present invention and resin compositions for comparison were obtained by mixing and dissolving each component as shown in Table 1. For each resin composition obtained, the curability by ultraviolet light, and gel fraction and pencil hardness of the cured film were evaluated according to the evaluation methods described below. The results are shown in Table 1.

(1) Curability by ultraviolet light: Each resin composition was applied on a glass plate so that a film thickness becomes 50 μm after curing and irradiated with ultraviolet light under the conditions of a lamp height of 8 cm and a conveyor speed of 5 m/min, using an 80 W/cm high-pressure mercury lamp (manufactured by Eye Graphics Co., Ltd.) in the atmospheric air. The curability was evaluated by counting the number of passes for irradiation required to make the film surface tack-free. A dose of ultraviolet light per each pass was about 160 mJ/cm$^2$.

(2) Gel fraction: A film was formed by passing an applied resin composition below the lamp four times under the above curing conditions. The cured film (weight: $W_1$) that was detached from the glass plate was dipped in methyl ethyl ketone under reflux at 80° C. for 3 hours and then dried at 100° C. for an hour followed by weighing (weight: $W_2$). The gel fraction (%) ($=W_2/W_1\times100$) was calculated.

(3) Surface hardness: A film was formed by the same way as in the above evaluation for the gel fraction, and the pencil hardness thereof was measured in accordance with JIS K-5400.

(A2) a maleimide compound that is a reaction product of a compound (d) bearing one (meth)acrylate group and one hydroxyl group in the molecule thereof and being cyclohexanedimethanol(meth)acrylate, and a monocarboxylic acid (e) bearing a maleimide group;

(A3) a maleimide compound that is a reaction product of a dioxane compound (f) represented by the general formula (1):

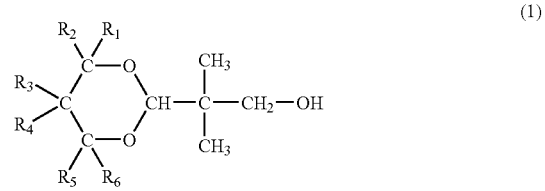

(in the formula (1), $R_1$ to $R_6$ are each a hydrogen atom, —CH$_2$—OH or C1 to C20 alkyl group) and a monocarboxylic acid (g) bearing a maleimide group.

TABLE 1

| | Example | | | | | | | | | | | | Comparative Example | |
|---|---|---|---|---|---|---|---|---|---|---|---|---|---|---|
| | 11 | 12 | 13 | 14 | 15 | 16 | 17 | 18 | 19 | 20 | 21 | 22 | 1 | 2 |
| Product of Example 1 | 9.5 | | | | | | | | | | | | | |
| Product of Example 2 | | 10 | 30 | | | | | | | | | | | |
| Product of Example 3 | | | | 50 | | | | | | | | | | |
| Product of Example 4 | | | | | 50 | | | | | | | | | |
| Product of Example 5 | | | | | | 50 | | | | | | | | |
| Product of Example 6 | | | | | | | 20 | | 30 | | | | | |
| Product of Example 7 | | | | | | | | 20 | | | | | | |
| Product of Example 8 | | | | | | | | | | 20 | 10 | 10 | | |
| Product of Example 9 | | | | | | | | | | | 10 | | | |
| Product of Example 10 | | | | | | | | | | | | 20 | | |
| KAYARAD DPHA *1 | 54.3 | 54 | 42 | 30 | 30 | 30 | 48 | 48 | 42 | 48 | 48 | 42 | 30 | 42 |
| KAYARAD R-551 *2 | 22.6 | 22.5 | 17.5 | 12.5 | 12.5 | 12.5 | 20 | 20 | 17.5 | 20 | 20 | 17.5 | 12.5 | 17.5 |
| KAYARAD TMPTA *3 | 13.6 | 13.5 | 10.5 | 7.5 | 7.5 | 7.5 | 12 | 12 | 10.5 | 12 | 12 | 10.5 | 7.5 | 10.5 |
| N-Ethylmaleimide | | | | | | | | | | | | | | 30 |
| N,N-4,9-Dioxa-1,12-Bismaleimide-dodecane | | | | | | | | | | | | | 50 | |
| UV curability (time) | 1 | 1 | 1 | 2 | 2 | 2 | 1 | 1 | 1 | 1 | 1 | 1 | 6 | ≧10 |
| Gel fraction (%) | 99.5 | 99.7 | 100 | 100 | 100 | 100 | 100 | 100 | 100 | 100 | 99.5 | 100 | 50 | 0 |
| Pencil hardness | 4H | 4H | 6H | 2H | 2H | 3H | 4H | 3H | 4H | 3H | 2H | 4H | ≦4H | — |

(Note)
*1 KAYARAD DPHA: Mixture of dipentaerythritol pentaacrylate and dipentaerythritol hexaacrylate produced by Nippon Kayaku Co., Ltd.
*2 KAYARAD R-551: Bisphenol A poly (n ≈ 4) ethoxy diacrylate produced by Nippon Kayaku Co., Ltd.
*3 KAYARAD TMDTA: Trimethylolpropane triacrylate produced by Nippon Kayaku Co., Ltd.

It is apparent from the results shown in Table 1 that the resin composition of the present invention can be easily cured by irradiation of ultraviolet light even in the absence of a photoinitiator, and can provide a uniform and transparent film.

INDUSTRIAL APPLICABILITY

Resin compositions containing (meth)acrylate compounds bearing a novel and specific maleimide group can be sufficiently cured by irradiation of light in a practical dose even when a photoinitiator is not used or used in a smaller amount than that of the prior art, and also can provide a film of high gel fraction.

The invention claimed is:

1. A photo-curable resin composition characterized by containing at least one compound selected from the maleimide compounds described in (A2) to (A3) below:

2. A maleimide compound (A2) that is a reaction product of a compound (d) bearing one (meth)acrylate group and one hydroxyl group in the molecule thereof and being cyclohexanedimethanol(meth)acrylate, and a monocarboxylic acid (e) bearing a maleimide group.

3. A maleimide compound (A3) that is a reaction product of a dioxane compound (f) represented by the general formula (1):

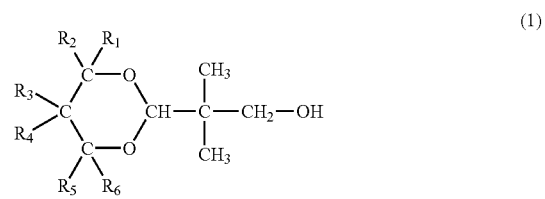

(in the formula (1), $R_1$ to $R_6$ are each a hydrogen atom, —$CH_2$—OH or C1 to C20 alkyl group) and a monocarboxylic acid (g) bearing a maleimide group.

4. A resin composition characterized by containing at least one compound selected from the (meth)acrylate compounds (A2) to (A3) bearing a maleimide group according to claim 1 and a polymerizable compound (B) other than the (meth) acrylate compounds (A2) to (A3).

5. The resin composition according to claim 4, wherein, said polymerizable compound (B) is at least one compound selected from a group consisting of a compound (F-1) bearing a (meth)acryloyl group, a compound (F-2) bearing a vinyl ether group and a compound bearing an N-vinyl group.

6. The resin composition according to claim 5, wherein, said compound (F-1) bearing a (meth)acryloyl group is at least one compound selected from a group consisting of a (poly)ester (meth)acrylate (F-1-1), urethane (meth)acrylate (F-1-2), epoxy (meth)acrylate (F-1-3), (poly)ether (meth) acrylate (F-1-4), alkyl (meth)acrylate or alkylene (meth) acrylate (F-1-5), (meth)acrylate (F-1-6) having an aromatic ring and (meth)acrylate (F-1-7) having an alicyclic structure.

7. The resin composition according to claim 5, wherein, said compound (F-2) bearing a vinyl ether group is at least one compound selected from a group consisting of an alkyl vinyl ether (F-2-1) wherein the other end thereof may be substituted with a halogen atom or a hydroxyl group, a cycloalkyl vinyl ether (F-2-2) wherein the other end thereof may be substituted with a halogen atom or a hydroxyl group, as well as a monovinyl ether, a divinyl ether or a polyvinyl ether (F-2-3) that has such a structure that a vinyl ether group is bonded to an alkylene group and also bonded to at least one group selected from a group consisting of an alkyl group, a cycloalkyl group and an aromatic group that may have a substitute, via at least one linkage group selected from a group consisting of an ether linkage, a urethane linkage and an ester linkage.

8. A cured article of the resin composition according to any one of claims 4 to 7.

* * * * *